United States Patent
Dai et al.

(10) Patent No.: US 12,147,748 B2
(45) Date of Patent: Nov. 19, 2024

(54) SYSTEM FOR MAKING CIRCUIT DESIGN CHANGES

(71) Applicant: Synopsys, Inc., Mountain View, CA (US)

(72) Inventors: Zuo Dai, San Jose, CA (US); Konstantinos Tsirogiannis, Copenhagen (DK); Tao Huang, San Jose, CA (US); Jaehan Jeon, Santa Clara, CA (US); Tobias Bjerregaard, Palo Alto, CA (US); Tao Lin, Palo Alto, CA (US); Min Pan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 457 days.

(21) Appl. No.: 17/724,226

(22) Filed: Apr. 19, 2022

(65) Prior Publication Data
US 2023/0334211 A1 Oct. 19, 2023

(51) Int. Cl.
*G06F 30/3315* (2020.01)
*G06F 119/12* (2020.01)

(52) U.S. Cl.
CPC ...... *G06F 30/3315* (2020.01); *G06F 2119/12* (2020.01)

(58) Field of Classification Search
CPC ............. G06F 30/3315; G06F 2119/12; G06F 30/3312
See application file for complete search history.

(56) References Cited

U.S. PATENT DOCUMENTS

| | | | | |
|---|---|---|---|---|
| 9,400,864 B2* | 7/2016 | Hathaway | ........... | G06F 30/3312 |
| 9,842,187 B1* | 12/2017 | Zejda | ................ | G06F 30/398 |
| 9,875,333 B1* | 1/2018 | Verma | ............... | G06F 30/3312 |
| 10,318,699 B1* | 6/2019 | Sivaswamy | ........ | G06F 30/3315 |
| 10,902,167 B1* | 1/2021 | Peddawad | ........ | G06F 30/3312 |
| 11,023,634 B1* | 6/2021 | Romain | ............. | G06F 30/3315 |
| 11,574,101 B2* | 2/2023 | Whitty | ............... | G06F 30/3312 |
| 11,797,739 B2* | 10/2023 | Guo | .................... | G06F 30/3312 |
| 2011/0191732 A1* | 8/2011 | Lyer | ...................... | G06F 30/00 |
| | | | | 716/108 |
| 2021/0216692 A1* | 7/2021 | Whitty | ............... | G06F 30/3312 |
| 2022/0092245 A1* | 3/2022 | Guo | .................... | G06F 30/327 |
| 2024/0265272 A1* | 8/2024 | Cristache | ........... | G07C 9/00174 |

OTHER PUBLICATIONS

A. B. Kahng, U. Mallappa and L. Saul, "Using Machine Learning to Predict Path-Based Slack from Graph-Based Timing Analysis," 2018 IEEE 36th International Conference on Computer Design (ICCD), Orlando, FL, USA, 2018, pp. 603-612, doi: 10.1109/ICCD. 2018.00096. (Year: 2018).*

* cited by examiner

*Primary Examiner* — Stacy Whitmore
(74) *Attorney, Agent, or Firm* — Patterson + Sheridan, LLP

(57) ABSTRACT

A system and method for changing a circuit design are described. The method includes generating a propagation graph for the circuit design and estimating slack values for some of the paths in the propagation graph. The method also includes making a virtual change to the circuit design and determining whether to accept or reject the change based on how the change affects the estimated slack values.

20 Claims, 17 Drawing Sheets

SYSTEM FOR MAKING CIRCUIT DESIGN CHANGES

TECHNICAL FIELD

The present disclosure relates to electronic circuit design.

BACKGROUND

During electronic circuit design, the circuit designer may make changes to the circuit design in an effort to improve or to optimize certain characteristics of the circuit design (e.g., power consumption, size, or timing). As the complexity of the circuit design increases and as the number of changes increases, it becomes more difficult and time consuming for the circuit designer to evaluate the effect of these changes.

SUMMARY

According to an embodiment, a method for changing a circuit design includes generating a propagation graph for the circuit design. The propagation graph includes nodes representing a first endpoint and a second endpoint of the circuit design, a first path to the first endpoint, a second path to the first endpoint, and a third path to the first endpoint. The method also includes based on determining that the first path has an arrival time that is less than an arrival time of the third path by an amount greater than a defined margin, estimating a first slack for the first path based at least in part on a slack value of the first endpoint and based on determining that the second path has an arrival time that is within the defined margin of the arrival time of the third path, tracing the second path to determine a second slack for the second path. The method further includes tracing the third path to determine a third slack for the third path, making a virtual change to the circuit design, determining a first endpoint slack for the first endpoint based at least in part on the first slack, the second slack, and the third slack, and accepting or rejecting the virtual change to the circuit design based at least in part on the first endpoint slack for the first endpoint and a second endpoint slack for the second endpoint.

The method may include performing static timing analysis on the circuit design before generating the propagation graph to determine the slack value of the first endpoint, the arrival time of the first path, the arrival time of the second path, and the arrival time of the third path. Performing the static timing analysis may determine a slack value for a starting point of the circuit design. The first slack may be based at least in part on the slack value for the starting point.

The method may include generating a subgraph representing a portion of the circuit design, sampling effects of a plurality of changes to the subgraph to produce a plurality of sample points, and performing regression on the plurality of sample points to determine a function that characterizes the effects of the plurality of changes. The first endpoint slack may be based at least in part on the function.

The method may include determining an estimated total negative slack for the circuit design based at least in part on the first endpoint slack and the second endpoint slack and determining a traced total negative slack for the circuit design based at least in part on the second endpoint slack but not the first endpoint slack. The method may also include based on a difference between the traced total negative slack and the estimated total negative slack exceeding a slack margin, tracing the first path a traced slack for the first path.

The method may include adding the first endpoint slack and the second endpoint slack to a total negative slack of the circuit design based on determining that the first endpoint slack and the second endpoint slack are negative. Accepting or rejecting the virtual change may be based at least in part on the total negative slack of the circuit design.

The nodes of the propagation graph may represent a starting point of the circuit design and an output of a combination logic cell of the circuit design.

According to another embodiment, a system for changing a circuit design includes a memory and a processor communicatively coupled to the memory. The processor generates a propagation graph for the circuit design. The propagation graph includes nodes representing a first endpoint and a second endpoint of the circuit design, a first path to the first endpoint, a second path to the first endpoint, and a third path to the first endpoint. The processor also based on determining that the first path has an arrival time that is less than an arrival time of the third path by an amount greater than a defined margin, estimates a first slack for the first path based at least in part on a slack value of the first endpoint and based on determining that the second path has an arrival time that is within the defined margin of the arrival time of the third path, traces the second path to determine a second slack for the second path. The processor further traces the third path to determine a third slack for the third path, makes a virtual change to the circuit design, determines a first endpoint slack for the first endpoint based at least in part on the first slack, the second slack, and the third slack, and accepts or rejects the virtual change to the circuit design based at least in part on the first endpoint slack for the first endpoint and a second endpoint slack for the second endpoint.

The processor may perform static timing analysis on the circuit design before generating the propagation graph to determine the slack value of the first endpoint, the arrival time of the first path, the arrival time of the second path, and the arrival time of the third path. Performing the static timing analysis may determine a slack value for a starting point of the circuit design, wherein the first slack is further based at least in part on the slack value for the starting point.

The processor may generate a subgraph representing a portion of the circuit design, sample effects of a plurality of changes to the subgraph to produce a plurality of sample points, and perform regression on the plurality of sample points to determine a function that characterizes the effects of the plurality of changes. The first endpoint slack may be based at least in part on the function.

The processor may determine an estimated total negative slack for the circuit design based at least in part on the first endpoint slack and the second endpoint slack and determine a traced total negative slack for the circuit design based at least in part on the second endpoint slack but not the first endpoint slack. The processor may also, based on a difference between the traced total negative slack and the estimated total negative slack exceeding a slack margin, trace the first path a traced slack for the first path.

The processor may add the first endpoint slack and the second endpoint slack to a total negative slack of the circuit design based on determining that the first endpoint slack and the second endpoint slack are negative. Accepting or rejecting the virtual change may be based at least in part on the total negative slack of the circuit design.

The nodes of the propagation graph may represent a starting point of the circuit design and an output of a combination logic cell of the circuit design.

According to another embodiment, a non-transitory computer readable medium stores instructions for changing a circuit design that, when executed by a processor, cause the processor to generate a propagation graph for the circuit design. The propagation graph includes nodes representing a first endpoint and a second endpoint of the circuit design, a first path to the first endpoint, a second path to the first endpoint, and a third path to the first endpoint. The processor also based on determining that the first path has an arrival time that is less than an arrival time of the third path by an amount greater than a defined margin, estimates a first slack for the first path based at least in part on a slack value of the first endpoint and based on determining that the second path has an arrival time that is within the defined margin of the arrival time of the third path, traces the second path to determine a second slack for the second path. The processor further traces the third path to determine a third slack for the third path, makes a virtual change to the circuit design, updates the first slack, the second slack, and the third slack based on the virtual change, determines a first endpoint slack for the first endpoint as the worst of the updated first slack, the updated second slack, and the updated third slack, determines a total negative slack for the circuit design based on adding the first endpoint slack and a second endpoint slack for the second endpoint, and accepts or rejects the virtual change to the circuit design based at least in part on the total negative slack for the circuit design.

The processor may perform static timing analysis on the circuit design before generating the propagation graph to determine the slack value of the first endpoint, the arrival time of the first path, the arrival time of the second path, and the arrival time of the third path.

The processor may generate a subgraph representing a portion of the circuit design, sample effects of a plurality of changes to the subgraph to produce a plurality of sample points, and perform regression on the plurality of sample points to determine a function that characterizes the effects of the plurality of changes. The first endpoint slack may be based at least in part on the function.

The nodes of the propagation graph may represent a starting point of the circuit design and an output of a combination logic cell of the circuit design.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
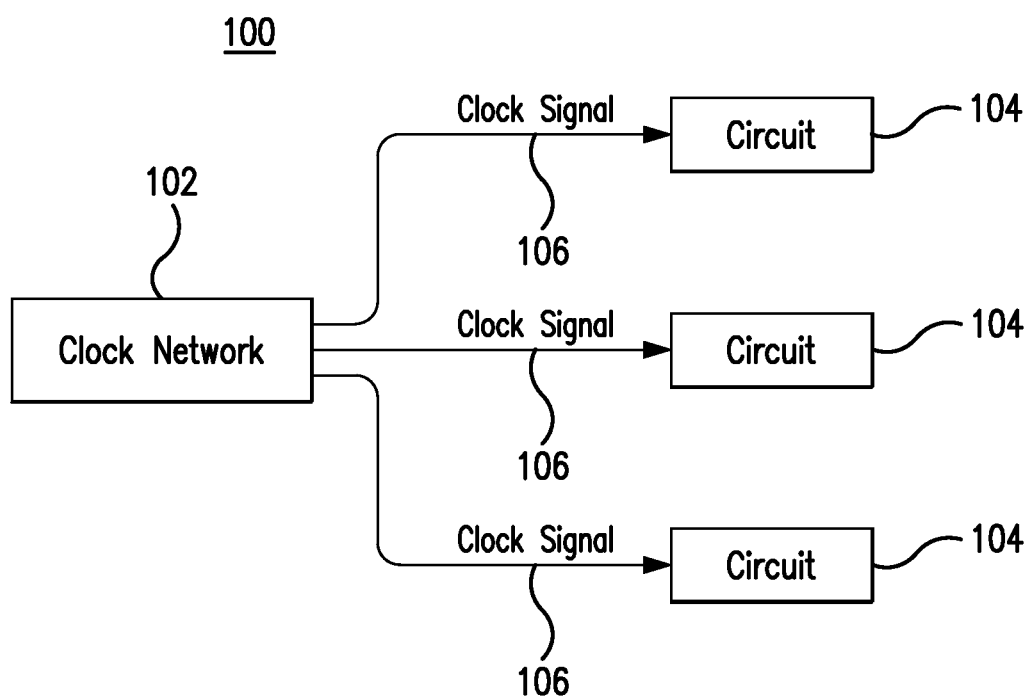
FIG. 1 illustrates an example system, which may be an electronic circuit design.

Aspects of the present disclosure relate to electronic circuit design. To assist in evaluating the effects of changes on a circuit design, a circuit designer may generate subgraphs representing different portions of the circuit design. The circuit designer may then make changes on these subgraphs and evaluate the effects of these changes on the subgraphs as a substitute for determining the effects of the changes on the entire circuit design. Unfortunately, this approach has several drawbacks. First, the local effects on the subgraphs may not be an accurate representation of the effect on a global objective (e.g., total negative slack (TNS)), which may result in the changes not improving the circuit design as expected or desired. Second, some global objectives have tradeoffs between them (e.g., TNS vs worst negative slack (WNS) vs power consumption). The local effects on the subgraphs may lack visibility or sensitivity for these tradeoffs. Third, it may take a long time and a significant amount of computing resources to make the changes sequentially, but making the changes in parallel results in interactions between local decisions to be ignored, which may make the combined solution not actually improve the circuit design overall or not improve the circuit design as desired.

This disclosure describes an improved process for making and evaluating changes to a circuit design (e.g., to a clock network or a data network). The process first exercises different changes in parallel on subgraphs and collects sample points to record the various impacts on different characteristics or metrics (e.g., slack, power consumption, size, etc.). Regressions are then performed to generate functions that characterize the effects of the different changes. The process then generates a propagation graph for the circuit design and, for each endpoint of the circuit design, prunes the paths into the endpoint that have arrival times that are outside of a predefined margin of the worst arrival time into the endpoint. The remaining paths are traced to determine the actual slacks of those paths. The slacks for the pruned paths are estimated based on the slacks and margins of the starting point and endpoint of each pruned path. When one or more changes are made to the circuit design (e.g., changes virtually made during a simulation), the functions that characterize the effects of those changes are used to update the slacks of the paths. The updated slacks of the paths are then used to determine the slacks of the endpoints of the circuit design and the total negative slack of the circuit design. The total negative slack may then be evaluated to determine whether to accept or reject the one or more changes. In this manner, not all of the paths in the circuit design are traced, which reduces the amount of time and computing resources needed to determine the effects of the changes on the circuit design, in certain embodiments. Although the above example describes the process evaluating the effects of changes on slack, the process may be used to evaluate the effects of changes on any suitable metric (e.g., power consumption and size).

The process described herein provides several technical advantages in certain embodiments. For example, the process estimates the effects of a change on a circuit design without necessarily tracing every path of the circuit design. As a result, the effects of the change may be determined and evaluated faster relative to conventional solutions in which every path is traced to determine the effects of the change. Moreover, because the process does not necessarily trace every path of the circuit design, the process can estimate the effects of the change to the circuit design using less computing resources (e.g., processor resources and memory resources) relative to conventional processes. A determination whether the circuit design change should be accepted or rejected may also be made faster relative to these conventional solutions. Consequently, the process shortens the amount of time it takes to design a circuit, in certain embodiments.

FIG. 1 illustrates an example system 100, which may be an electronic circuit design. As seen in FIG. 1, the system 100 includes a clock network 102 and one or more circuits 104. Generally, the clock network 102 generates and communicates one or more clock signals 106 to the one or more circuits 104. The circuits 104 use the clock signals 106 to coordinate their operations. A circuit 104 or multiple circuits 104 may also be referred to as a data network.

A circuit designer designs the clock network 102 and the one or more circuits 104. The circuit designer may make changes or adjustments to the clock network 102 and the circuits 104 to improve the operation of the clock network 102 and the circuits 104. For example, the circuit designer may make adjustments or changes to improve the power consumption, size, or delay or slack of the clock network 102 and the circuits 104. As the clock network 102 and the circuits 104 grow more complex, and as the number of adjustments or changes increases, it becomes more difficult for the circuit designer to evaluate the effects of the adjustments and changes on the clock network 102 and the circuits 104. The circuit designer may use the process described herein to reduce the time and computing resources needed to evaluate the effects of the adjustments or changes. In some embodiments, the computer designer may use a computer system (e.g., the computer 1700, shown in FIG. 17) to perform the process.

Figure 2:
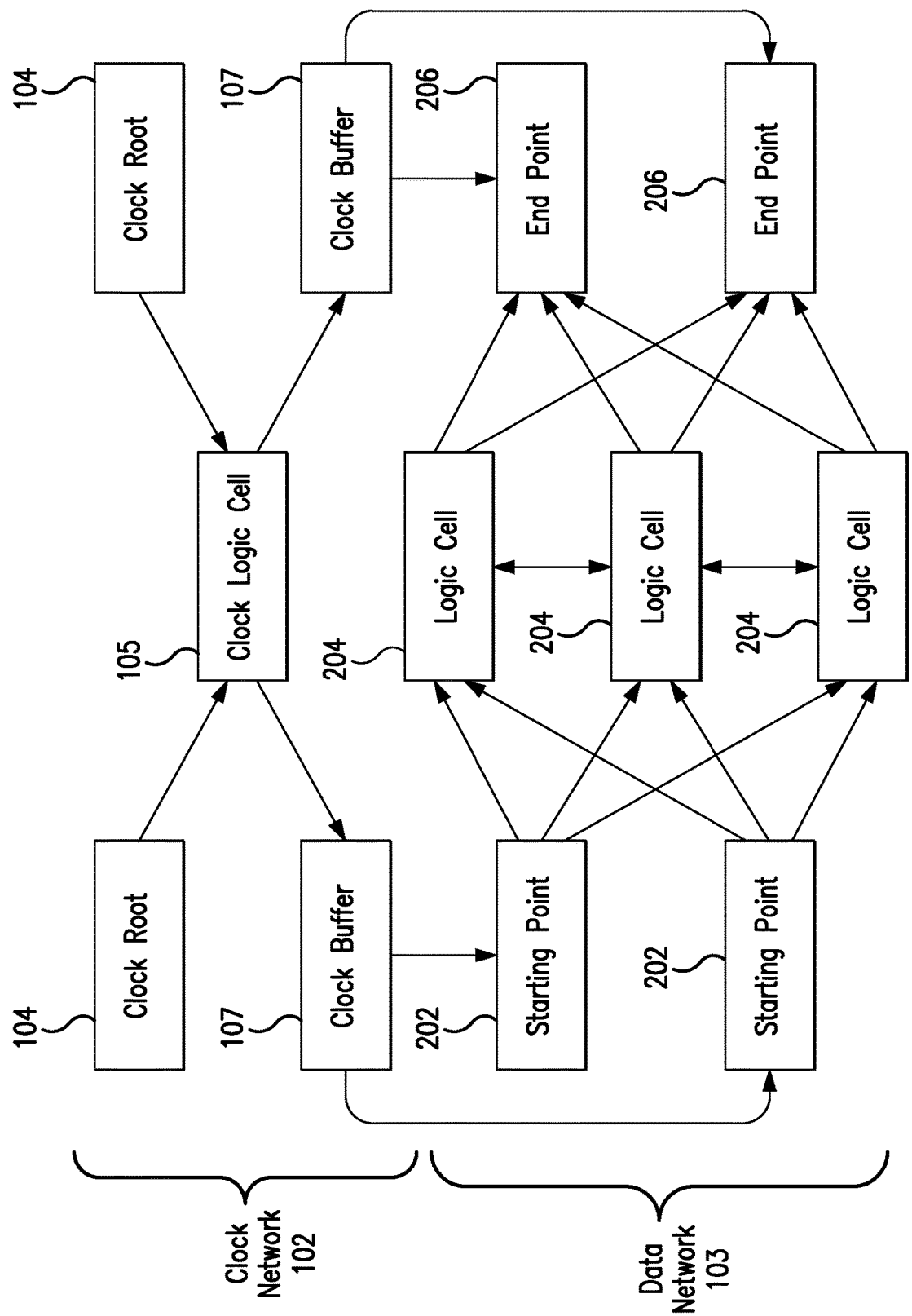
FIG. 2 illustrates an example clock network and data network of the system of FIG. 1.

The circuit designer may make adjustments or changes to any portion of the electronic circuit design. As an illustrative example, the circuit designer may use the process described herein to make and evaluate adjustments or changes to the clock network 102 or to one or more of the circuits 104. FIG. 2 illustrates an example clock network 102 and data network 103 of the system 100 of FIG. 1. As seen in FIG. 2, the clock network 102 includes various components (e.g., one or more clock roots 104, one or more clock logic cells 105, and one or more clock buffers 107) that operate to generate one or more signals. The data network 103 includes one or more starting points 202, one or more logic cells 204, and one or more endpoints 206. Signals from the clock roots 104 may be propagated to the clock logic cell 105, then to the clock buffers 107, then to starting points 202 and/or the end points 206 in the data network 103. The signals of the starting points 202 may be communicated to the logic cells 204. The logic cells 204 may evaluate the signals from the starting points 202 and from other logic cells 204 to produce signals to the endpoints 206. The endpoints 206 may then communicate the signals to other components outside the data network 103.

The starting points 202 may include one or more components that generate or store signals. For example, the starting points 202 may include oscillators or registers that prepare signals for the logic cells 204. The logic cells 204 may include logic elements, such as combinational logic, that evaluates the signals from the starting points 202. The logic cells 204 may also communicate signals to other logic cells 204, which are then evaluated by those logic cells 204. In some embodiments, the logic cells 204 may produce signals with certain frequencies based on the signal from the starting points 202 and the other logic cells 204. The endpoints 206 receive the signals from the logic cells 204 and communicate those signals to other components in the system 100. The communicated signals may be clock signals with a particular frequency.

Figure 3:
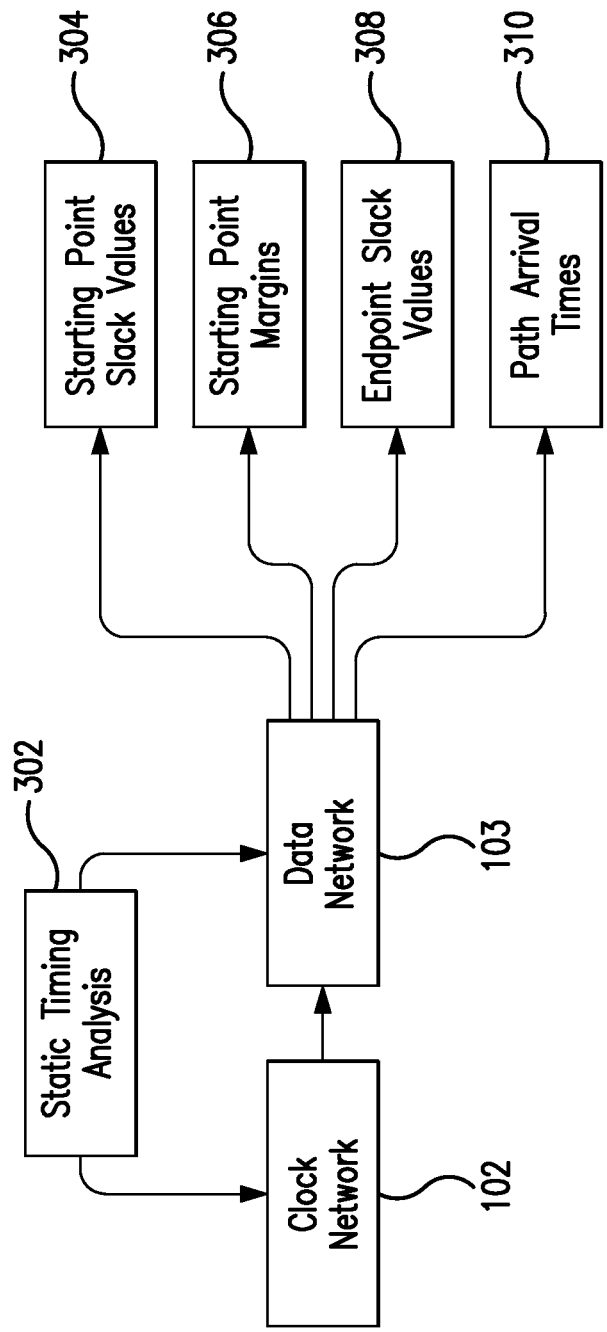
FIG. 3 illustrates an example static timing analysis in the system of FIG. 1.

FIG. 3 illustrates an example static timing analysis in the system 100 of FIG. 1. As seen in FIG. 3, the circuit designer may perform a static timing analysis 302 on the clock network 102 and the data network 103. The circuit designer may use the computer system to perform the static timing analysis 302. By performing the static timing analysis 302, certain metrics may be measured. In the example of FIG. 3, by performing the static timing analysis 302, the computer system determines certain values and margins for the clock network 102 and the data network 103.

First, through static timing analysis 302, the computer system determines starting point slack values 304 and starting point margins 306 for the data network 103. The starting point slack values 304 may be the slack values of the starting points of the data network 103. The starting point margins 306 may be positive values that indicate an amount of time for which the starting points of the data network 103 may be delayed or postponed without negatively impacting the slack at the endpoints of the data network 103.

The endpoint slack values 308 may be the slack values of the endpoints of the data network 103. The negative endpoint slack values 308 may be summed to produce the total negative slack of the data network 103. The path arrival times 310 indicate the arrival times on each path within the data network 103. Each path arrival time 310 indicates a time at which a signal reaches an endpoint of that path. The computer system may use the values and margins produced by the static timing analysis 302 to estimate the slacks of certain paths within the data network 103.

Figure 4:
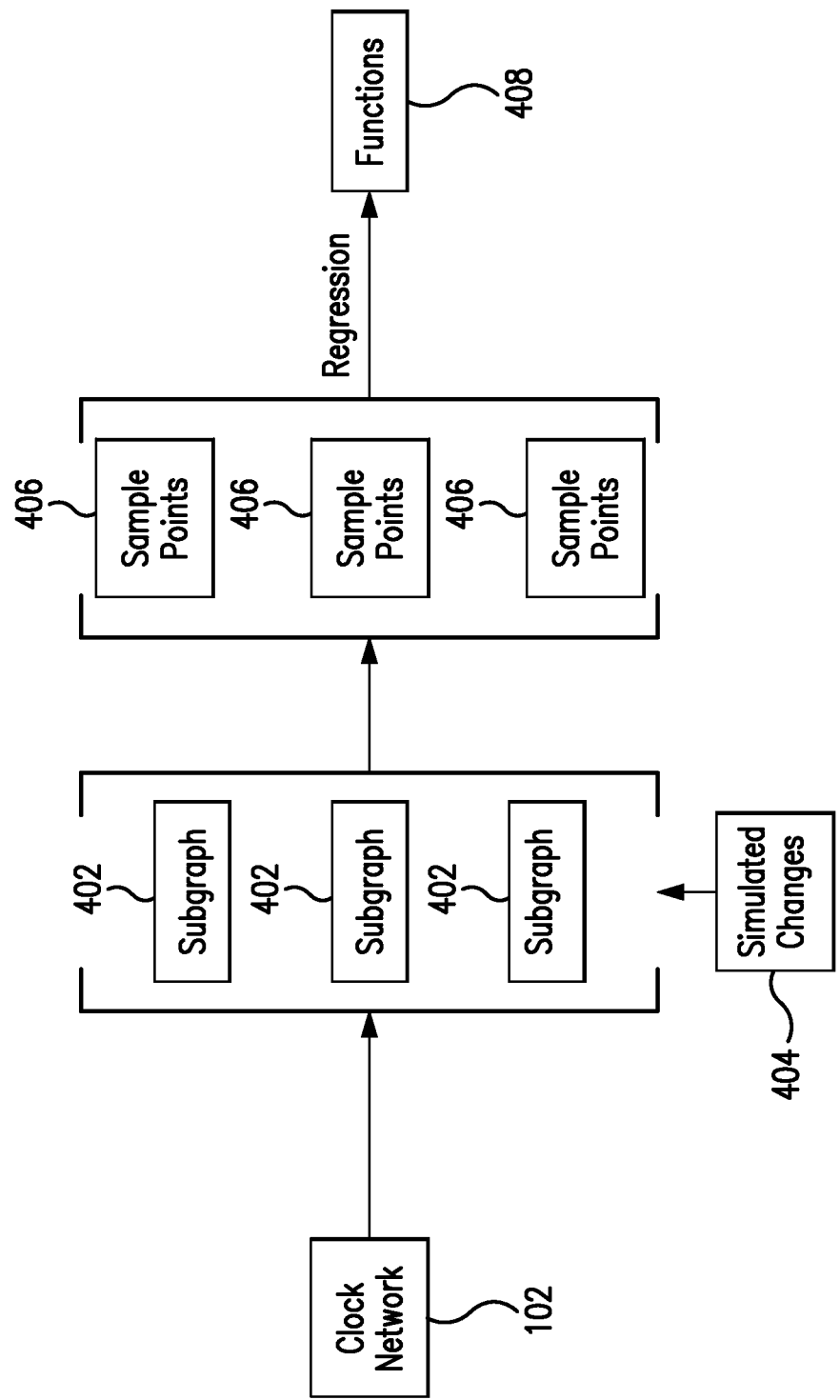
FIG. 4 illustrates an example function determination in the system of FIG. 1.

FIG. 4 illustrates an example function determination in the system 100 of FIG. 1. Generally, the computer system may simulate various changes and sample the effects of those changes. The computer system then performs a regression on the sampled effects to determine functions that characterize the effects of the changes.

As seen in FIG. 4, the computer system begins by generating subgraphs 402 from the clock network 102. Each subgraph 402 represents a portion of the clock network 102. For example, each subgraph 402 may represent a different set of components of the clock network 102 that form a different set of paths within the clock network 102. The computer system may generate any suitable number of subgraphs 402 from the clock network 102.

The computer system then simulates changes 404 on one or more of the subgraphs 402. The computer system may simulate any number of changes 404 on the different subgraphs 402. By simulating the changes 404 on the subgraphs 402 instead of on the full clock network 102, the computer system may simulate the changes 404 in parallel on different subgraphs 402, which reduces the time it takes to simulate the changes 404.

The computer system then determines the effects of the simulated changes 404 on the subgraphs 402. For example, the computer system may sample certain metrics, such as power consumption, size and timing of each subgraph 402. By adjusting the simulated changes 404 and sampling the effects of the changes 404, the computer system may generate sample points 406 for the subgraphs 402. The sample points 406 may produce a plot of the effects of the simulated changes 404 on the subgraphs 402.

The computer system then performs a regression on the sample points 406 to determine one or more functions 408 that characterize the effects of the simulated changes 404. In other words, by performing the regression, the computer system extrapolates the effects of the simulated changes 404 using the sample points 406. The computer system may subsequently use these functions 408 to determine the effects of changes made by the circuit designer on the circuit design.

Figure 5:
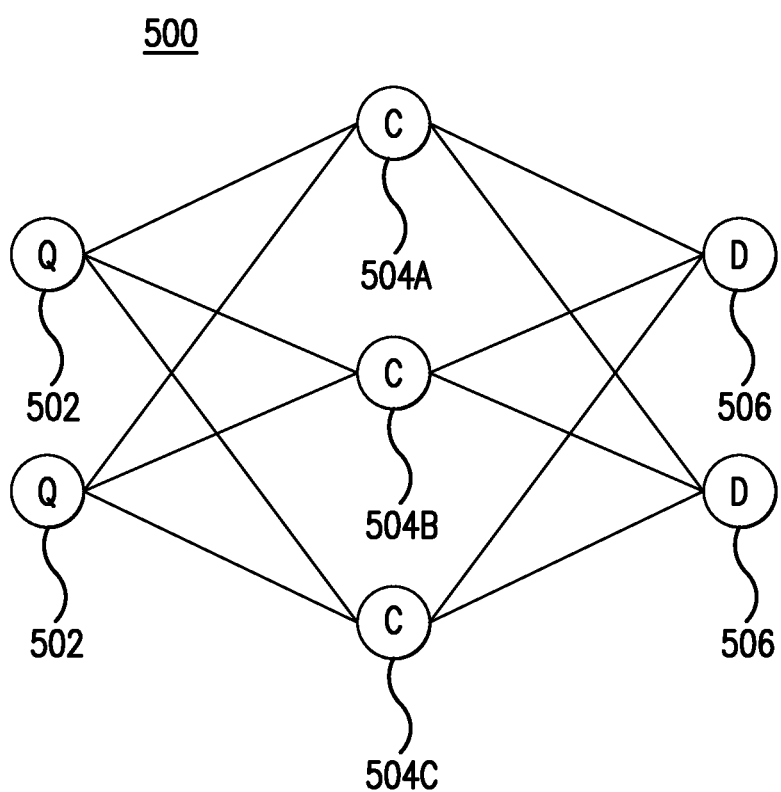
FIG. 5 illustrates an example propagation graph in the system of FIG. 1.

The computer system generates a propagation graph of the data network 103. The propagation graph may be a simplified representation of the components and paths within the data network 103. FIG. 5 illustrates an example propagation graph 500 in the system 100 of FIG. 1. As seen in FIG. 5, the propagation graph 500 includes starting points 502 labeled Q, combinational output points 504A, 504B and 504C labeled C, and endpoints 506 labeled D. The computer system may generate the propagation graph 500 by analyzing the data network 103 and generating a graph node for each starting point, combinational output pin, and endpoint. The other pins within the data network 103 (e.g., combinational input pins) may be ignored when generating the propagation graph 500.

Additionally, the propagation graph 500 includes edges between the nodes of the propagation graph 500. Each of the edges represents a path between the pins represented by the nodes connected by the edge. In the example of FIG. 5, the edge between a starting point 502 and the combinational output point 504A represents a path between the starting point in the data network 103 representing by the starting point 502 and the combinational output pin represented by the combinational output point 504A. The computer system may evaluate the propagation graph 500, including the nodes and edges within the propagation graph 500, to determine the slack of each path within the data network 103.

Figure 6:
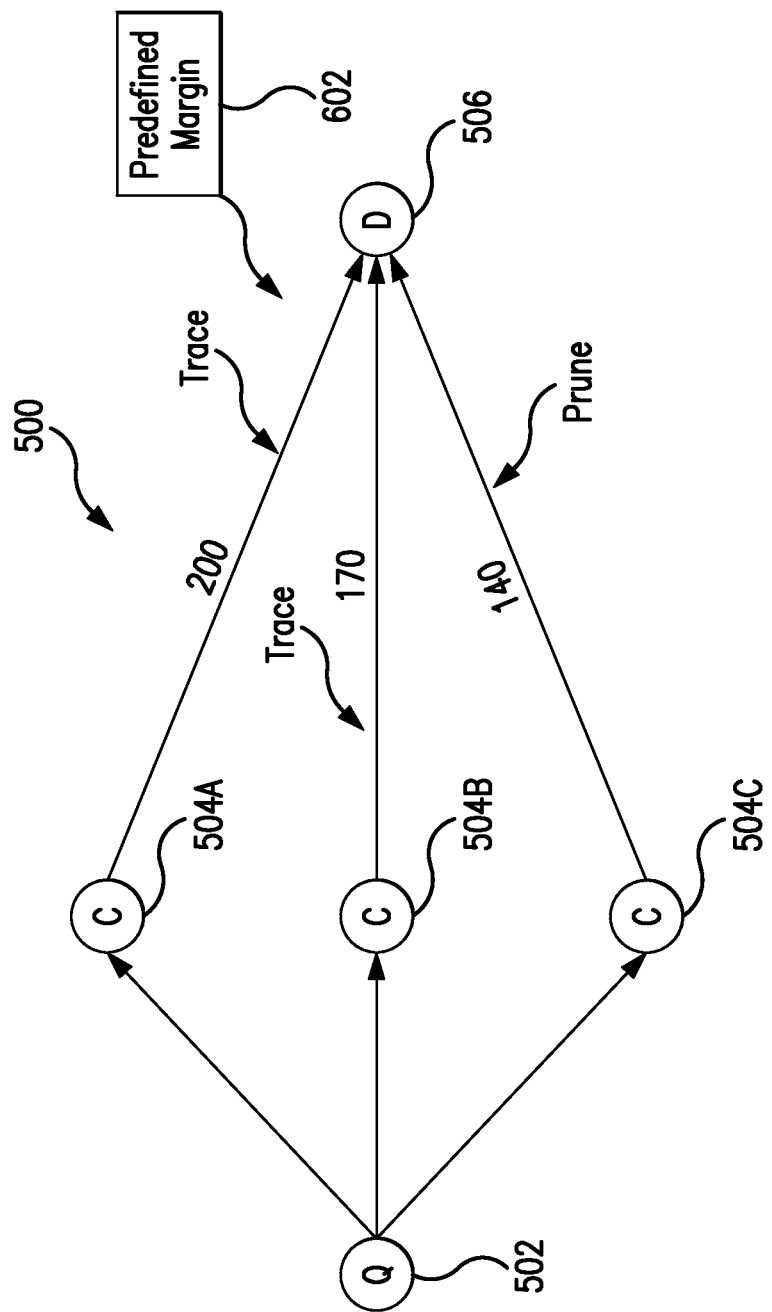
FIG. 6 illustrates an example arrival time evaluation in the system of FIG. 1.

FIG. 6 illustrates an example arrival time evaluation in the system 100 of FIG. 1. As seen in FIG. 6, the computer system analyzes arrival times on the paths in the propagation graph 500 to determine how to measure the slack of the path. In certain embodiments, by using the process shown in FIG. 6, the computer system uses less time and computing resources to measure the slack of the paths in the propagation graph 500.

As described previously, the computer system may have performed static timing analysis to determine the path arrival times for the paths within the data network 103. FIG. 6 shows the determined path arrival times for some of the paths in the propagation graph 500. For clarity, not all of the path arrival times have been included in the example of FIG. 6. The path between the combinational output point 504A and the endpoint 506 has an arrival time of 200. The path between the combinational output point 504B and the endpoint 506 has an arrival time of 170. The path between the combinational output point 504C and the endpoint 506 has an arrival time of 140. The arrival time may be measured in any suitable unit of time (e.g., picoseconds).

The computer system evaluates the arrival time along each of the paths to determine how the slack for each path should be determined. First, the computer system determines that the worst arrival time for any path ending at the endpoint 506 is 200. The computer system then determines the paths ending at the endpoint 506 with an arrival time that is outside a predefined margin 602 of the worst arrival time. The predefined margin 602 may be expressed using the same units as the arrival times of the paths (e.g., picoseconds). The predefined margin 602 may be selected in any suitable manner. For example, during a post route stage of design, the circuit designer may select a predefined margin 602 around fifty picoseconds. During a pre-route stage, the circuit designer may select a larger predefined margin 602 around one hundred picoseconds.

If the predefined margin 602 is fifty picoseconds, then the computer system may determine that the path between the combinational output point 504B and the endpoint 506 is within the predefined margin 602 of the worst arrival time, because the arrival time of the path between the combinational output point 504B and the endpoint 506 is 170 picoseconds while the worst arrival time is 200 picoseconds. Furthermore, the computer system may determine that the arrival time between the combinational output point 504C and the endpoint 506 falls outside the predefined margin 602 of the worst arrival time, because the arrival time of the path between the combinational output point 504C and the endpoint 506 is 140 picoseconds while the worst arrival time is 200 picoseconds.

The computer system may determine the slack for a path with an arrival time within the predefined margin 602 of the worst arrival time by tracing the path. In this manner, the computer system measures the actual slack of the path. For paths with arrival times that fall outside the predefined margin 602 of the worst arrival time, the computer system prunes those paths from the propagation graph 500 and estimates the slack for those paths. In this manner, the computer system does not trace the pruned paths, which reduces the time and computing resources needed to determine the slacks of the paths in the propagation graph 500, in certain embodiments. In the example of FIG. 6, the computer system traces the paths between the combinational output point 504A and the endpoint 506 (which has the worst arrival time), and the path between the combinational output point 504B and the endpoint 506. The computer system prunes the path between the combinational outpoint 504C and the endpoint 506.

Figure 7:
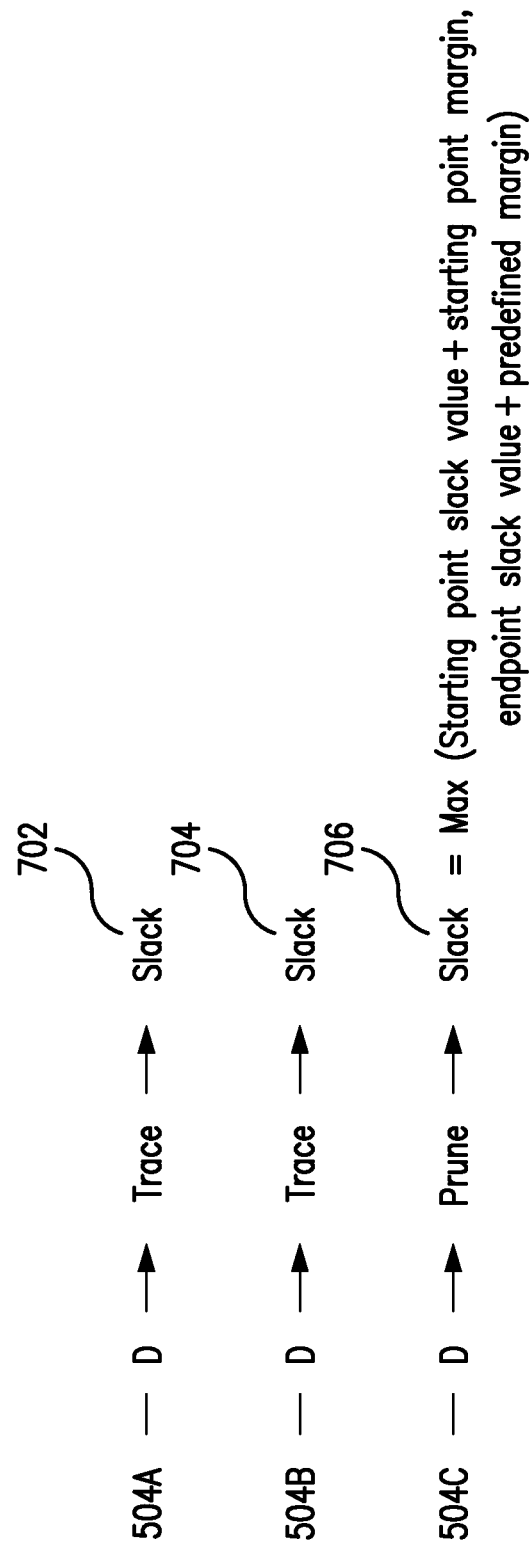
FIG. 7 illustrates an example path slack determination in the system of FIG. 1.

FIG. 7 illustrates an example path slack determination in the system 100 of FIG. 1. As seen in FIG. 7, the computer system determines a slack 702 for the path between the combinational outpoint 504A and the endpoint 506 by tracing that path. As a result, the slack 702 is the actual slack of that path. Additionally, the computer system traces the path between the combinational output point 504B and the endpoint 506 to determine a slack 704 for that path. As a result, the slack 704 is the actual slack of that path. These paths were traced, because their arrival times were within the predefined margin 602 of the worst arrival time into the endpoint 506.

The computer system estimates a slack 706 for the path between the combinational output point 504C and the endpoint 506 because that path had an arrival time outside of the predefined margin 602 of the worst arrival time into the endpoint 506. In the example of FIG. 7, the computer system estimates the slack 706 as the maximum of two values. The first value is the sum of the starting point slack value and the starting point margin for the path. The starting point slack value is the slack value for the starting point of the path, and the starting point margin is the starting point margin for the starting point of the path. The second value is the sum of the endpoint slack value and the predefined margin. The endpoint slack value is the endpoint slack value for the endpoint 506 of the path, and the predefined margin is the predefined margin 602 used to evaluate whether the path was traced or pruned. The starting point slack value, the starting point margin, and the endpoint slack value may have been previously determined using static timing analysis.

The slacks 702, 704, and 706 represent the best case and worst case scenarios for the slack at the endpoint 506. The slacks 702 and 704 were determined through tracing, and thus, the slacks 702 and 704 represent the best case scenario for the slack of the endpoint 506. The slack 706 was estimated, and thus, the slack 706 represents the worst case scenario for the slack of the endpoint 506. As a result, the slacks 702, 704, and 706 establish the bounds for the slack of the endpoint 506, with the actual slack of the endpoint 506 being in between those bounds. If the bounds are sufficiently close, then the circuit designer may use the determined slacks 702, 704, and 706 to approximate the slack of the endpoint 506. Stated differently, the circuit designer may not need to know the exact slack of the endpoint 506 to make a decision on whether to accept or reject a change to the circuit design. The approximated slack of the endpoint 506 may be sufficient.

Figure 8:
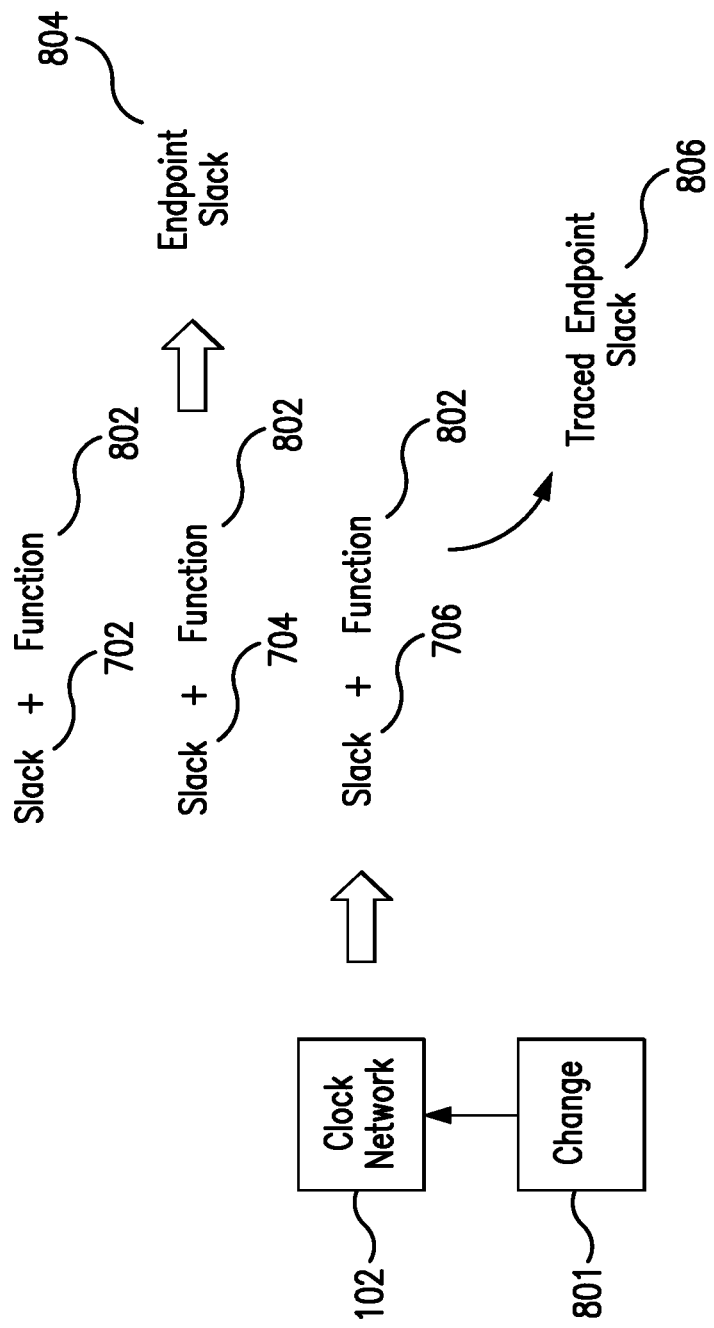
FIG. 8 illustrates an example endpoint slack determination in the system of FIG. 1.

FIG. 8 illustrates an example endpoint slack determination in the system 100 of FIG. 1. Generally, after the slacks for the paths in the propagation graph 500 are determined, the computer designer may select one or more changes 801 to be made to the clock network 102. The computer system then makes one or more of the changes 801 to the clock network 102 (e.g., the changes may be made virtually to simulate those changes on the clock network 102). The computer system then determines the effect of these changes 801 on the clock network 102. The changes 801 may be virtual changes in that these changes 801 are simulated on the clock network 102. Stated differently, the changes 801 may not be actually made to the clock network 102 at this stage. Rather, the changes 801 and their effects are simulated on the clock network 102.

The computer system uses the functions previously determined through regression to determine the effects of the changes 801 on the clock network 102. For example, the computer system may use the functions that characterize the effects of the changes 801. In the example of FIG. 8, the computer system updates the slacks 702, 704, and 706 for the paths in the data network 302 using function values 802 determined from the functions that characterize the effects of the changes 801. For example, the computer system may add the function values 802 to the slacks 702, 704, and 706. The function values 802 may indicate the expected change to the slacks of the paths as determined using the previously regressed function. The computer system may input the change 801 or magnitude of the change 801 into the previously determined function. The function may then produce the function values 802.

The computer system then determines an endpoint slack 804 for the endpoint 506 of the paths. The endpoint slack 804 may be the worst of the updated slacks 702, 704, or 706. In other words, after adding the function values 802 to the slacks 702, 704, and 706, the lowest updated slack value is selected as the endpoint slack 804 for the endpoint 506. As a result, the endpoint slack 804 is the worst slack of the paths ending at the endpoint 506.

The computer system also determines a traced endpoint slack 806. In some embodiments, the traced endpoint slack 806 is the worst updated slack for a traced path ending at the endpoint 506. In other words, the traced endpoint slack 806 does not consider the updated slacks for paths that were pruned. The computer system uses the endpoint slack 804 and the traced endpoint slack 806 to evaluate whether the change 801 should be accepted or rejected.

The computer system may repeat this process for each endpoint in the propagation graph, to determine an endpoint slack 804 and a traced endpoint slack 806 for each endpoint in the propagation graph.

Figure 9:
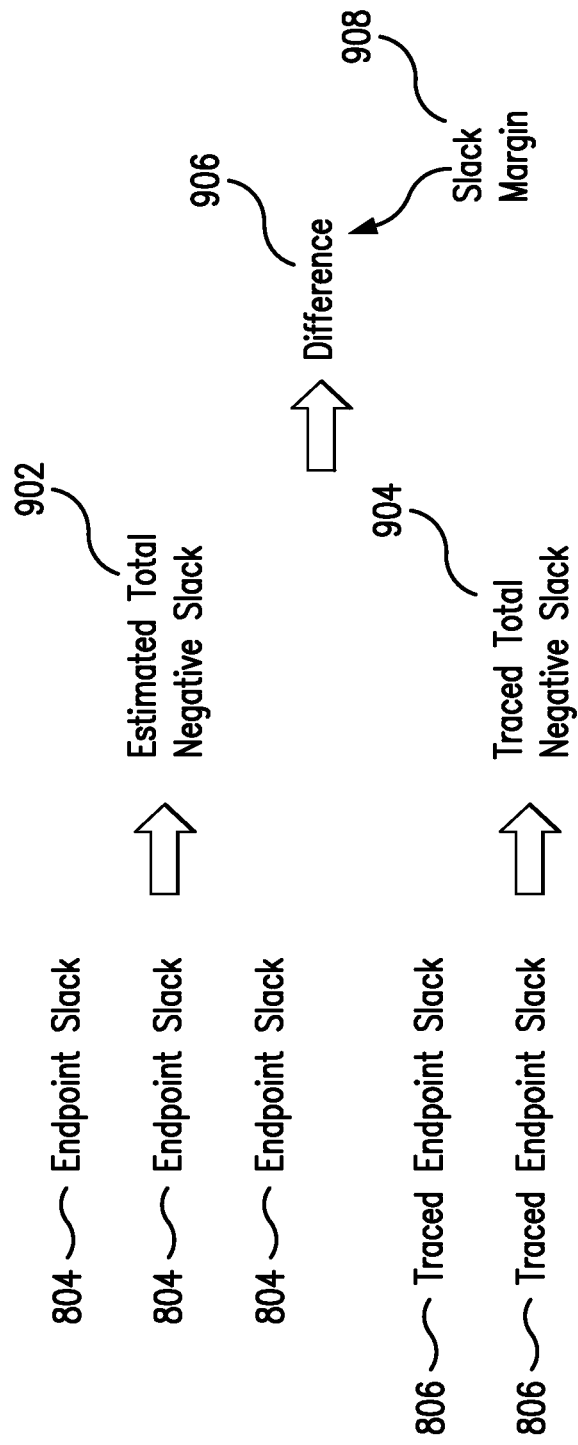
FIG. 9 illustrates an example difference determination in the system of FIG. 1.

FIG. 9 illustrates an example difference determination in the system 100 of FIG. 1. As seen in FIG. 9, the computer system determines an estimated total negative slack 902 for the circuit design. For example, the computer system may review each endpoint slack 804 for each endpoint in the circuit design. If an endpoint slack 804 for an endpoint is negative, then the computer system adds the endpoint slack 804 to the estimated total negative slack 902. If the endpoint slack 804 is positive, then the computer system may ignore the endpoint slack 804. As a result, the estimated total negative slack 902 is a sum of the negative endpoint slacks 802 for each endpoint in the circuit design.

Additionally, the computer system determines a traced total negative slack 904. The computer system may review each traced endpoint slack 806 for the endpoints in the circuit to determine the traced total negative slack 904. If a traced endpoint slack 806 for an endpoint is negative, then the computer system adds the traced endpoint slack 806 to the traced total negative slack 904. If the traced endpoint slack 806 for an endpoint is positive, then the computer system ignores the traced endpoint slack 806. As a result, the traced total negative slack 904 is a sum of the negative traced endpoint slacks 806 for the endpoints in the circuit design.

The computer system calculates a difference 906 between the estimated total negative slack 902 and the traced total negative slack 904 of the circuit design. The computer system uses the difference 906 to determine whether the estimated total negative slack 902 for the circuit design should be re-evaluated. For example, the computer system may compare the difference 906 to a slack margin 908 to determine whether the estimated total negative slack 902 should be re-evaluated. In some embodiments, the slack margin 908 may be a percentage of the total negative slack of the circuit as measured during the static timing analysis. For example, the slack margin 908 may be one percent or two percent of the total negative slack of the circuit design measured during the static timing analysis. If the difference 906 is less than or within the slack margin 908, then the computer system may determine that the estimated total negative slack 902 does not need to be re-evaluated. If the difference 906 exceeds or is outside of the slack margin 908, then the computer system may determine that the estimated total negative slack 902 should be re-evaluated.

In some embodiments, the computer system re-evaluates the estimated total negative slack 902 by re-visiting the propagation graph 500 (e.g., the propagation 500 shown in FIGS. 5 and 6). The computer system evaluates the paths that were pruned and traces some of the pruned paths with the worst arrival times to measure the actual slacks of these paths. In this manner, the computer system begins using the actual slacks for these paths rather than the estimated slacks for these paths. The computer system then updates the endpoint slacks 804 and the traced endpoint slacks 806 for the endpoints in the circuit design. In this manner, the computer system reduces the difference 906 between the estimated total negative slack 902 and the traced total negative slack 904, in certain embodiments.

In some embodiments, if tracing the pruned paths does not reduce the difference 906 below the slack margin 908, the computer system may make adjustments to the changes 801 made to the circuit design in the example of FIG. 8. By adjusting the changes 801, the computer system updates the function values 802 that are used to update the slacks of the paths. In this manner, the computer system adjusts the changes 801 to better improve or optimize the various performance metrics of the circuit design, which reduces the difference 906 between the estimated total negative slack 902 and the trace total negative slack 904, in some embodiments.

Figure 10:
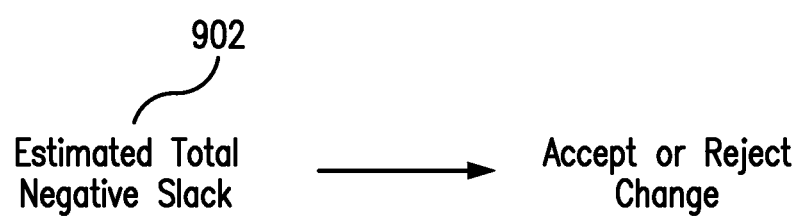
FIG. 10 illustrates an example virtual change determination in the system of FIG. 1.

FIG. 10 illustrates an example of virtual change determination in the system 100 of FIG. 1. As seen in FIG. 10, when the difference 906 is less than or within the slack margin 908, the computer system evaluates the estimated total negative slack 902 for the circuit design to determine whether the change 801 (shown in FIG. 8) should be accepted or rejected. For example, the computer system may present the estimated total negative slack 902 to the circuit designer, and the circuit designer may determine whether the estimated total negative slack 902 is acceptable. If the estimated total negative slack 902 is acceptable, the computer designer may accept the change 801. If the estimated total negative slack 902 is not acceptable, the circuit designer may reject the change 801.

In some embodiments, the computer system compares the estimated total negative slack 902 to a threshold to determine whether to accept or reject the change 801. The threshold may have been set by the circuit designer. If the estimated total negative slack 902 is below the threshold, then the computer system may accept the change 801. If the estimated total negative slack 902 is above the threshold, then the computer system may reject the change 801.

Figure 11:
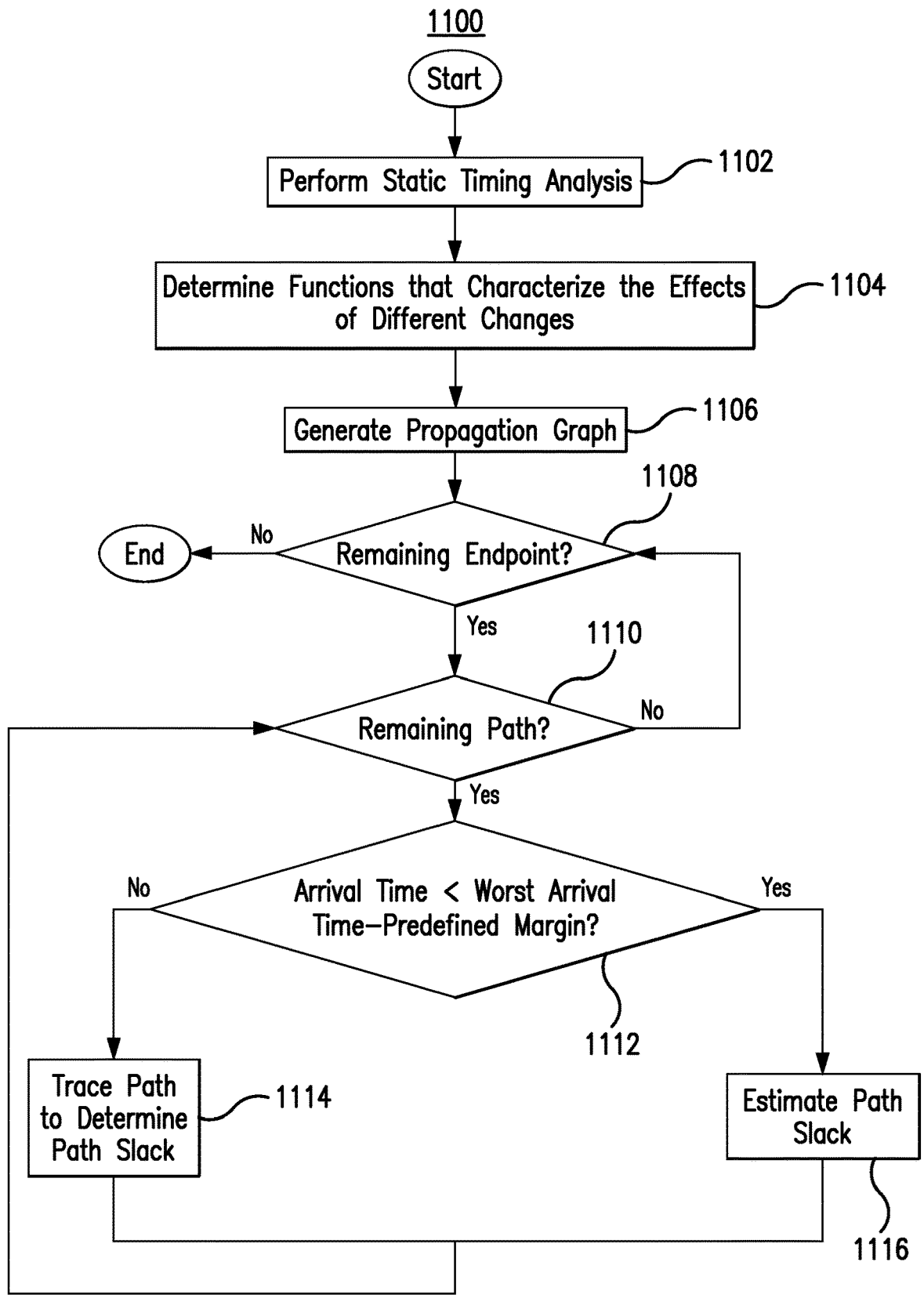
FIG. 11 is a flowchart of an example method for determining the slacks of paths.

FIG. 11 is a flowchart of an example method 1100. In particular embodiments, the computer system (e.g., the computer system 1700 of FIG. 17) performs the method 1100. By performing the method 1100, the computer system determines the slacks of paths within a circuit design without necessarily tracing every path of the circuit design, which improves the time and competing resources needed to determine the slacks of the paths of the circuit design.

In block 1102, the computer system performs static timing analysis on a circuit design. The circuit design may include a clock network and one or more circuits that form a data network. The computer system may perform the static timing analysis on the clock network or the one or more circuits. By performing the static timing analysis, the computer system determines various slack values and margins for the circuit design. For example, the static timing analysis may produce the starting point slack values and the endpoint slack values for the circuit design. Additionally, the static timing analysis may produce the starting point margins for the circuit design. Moreover, the static timing analysis may produce the arrival times of signals over the various paths of the circuit design. The computer system may use the results of the static timing analysis to determine the slacks of the paths in the circuit design.

In block 1104, the computer system determines functions that characterize the effects of different changes. For example, the computer system may generate subgraphs of the clock network or the one or more circuits. The subgraphs may represent different portions of the clock network or the one or more circuits. The computer system then simulates the various changes on the subgraphs to see the effects of making the changes on the subgraphs. The computer system may sample the effects of these changes on metrics, such as power consumption, size, and slack. The computer system then performs a regression on the sampled points to determine functions that characterize the effects of the various changes. The computer system may later use these functions to determine the effects of changes on the circuit design.

In block 1106, the computer system generates a propagation graph that represents the data network. In some embodiments, the computer system generates the propagation graph by adding graph nodes that represent the starting points, combinational output pins, and endpoints of the data network. As a result, certain pins of the data network, such as combinational input pins, may be ignored when generating the propagation graph. The computer system may also add edges between the graph nodes representing the paths between the points of the data network represented by the nodes of the propagation graph.

The computer system then analyzes each edge or path in the propagation graph in blocks 1108, 1110, and 1112. In blocks 1108 and 1110, the computer system determines whether there are any remaining endpoints or remaining paths to be evaluated. If there are endpoints or paths remaining to be evaluated, the computer system selects the next path and determines whether the arrival time for that path is less than or within a predefined margin of the worst arrival time for the endpoint into which that path leads. The arrival time for the path and the worst arrival time for the endpoint may have been determined during the static timing analysis. The predefined margin may have been selected by the circuit designer.

If the arrival time for the path is within the predefined margin of the worst arrival time, then the computer system traces the path to determine the actual slack of the path in block 1114. If the arrival time is outside the predefined margin of the worst arrival time, then the computer system estimates the slack of the path in block 1116. In some embodiments, the computer system estimates the slack of the path to be the maximum of two values. The first value is the sum of the starting point slack value for the path and the starting point margin for the path. The second value is a sum of the endpoint slack value of the path and the predefined margin. In this manner, the computer system determines a worst case bound for the slack of the path without tracing the path. When each path in the clock network or the one or more circuits has been analyzed, the computer system ends the method 1100.

Figure 12:
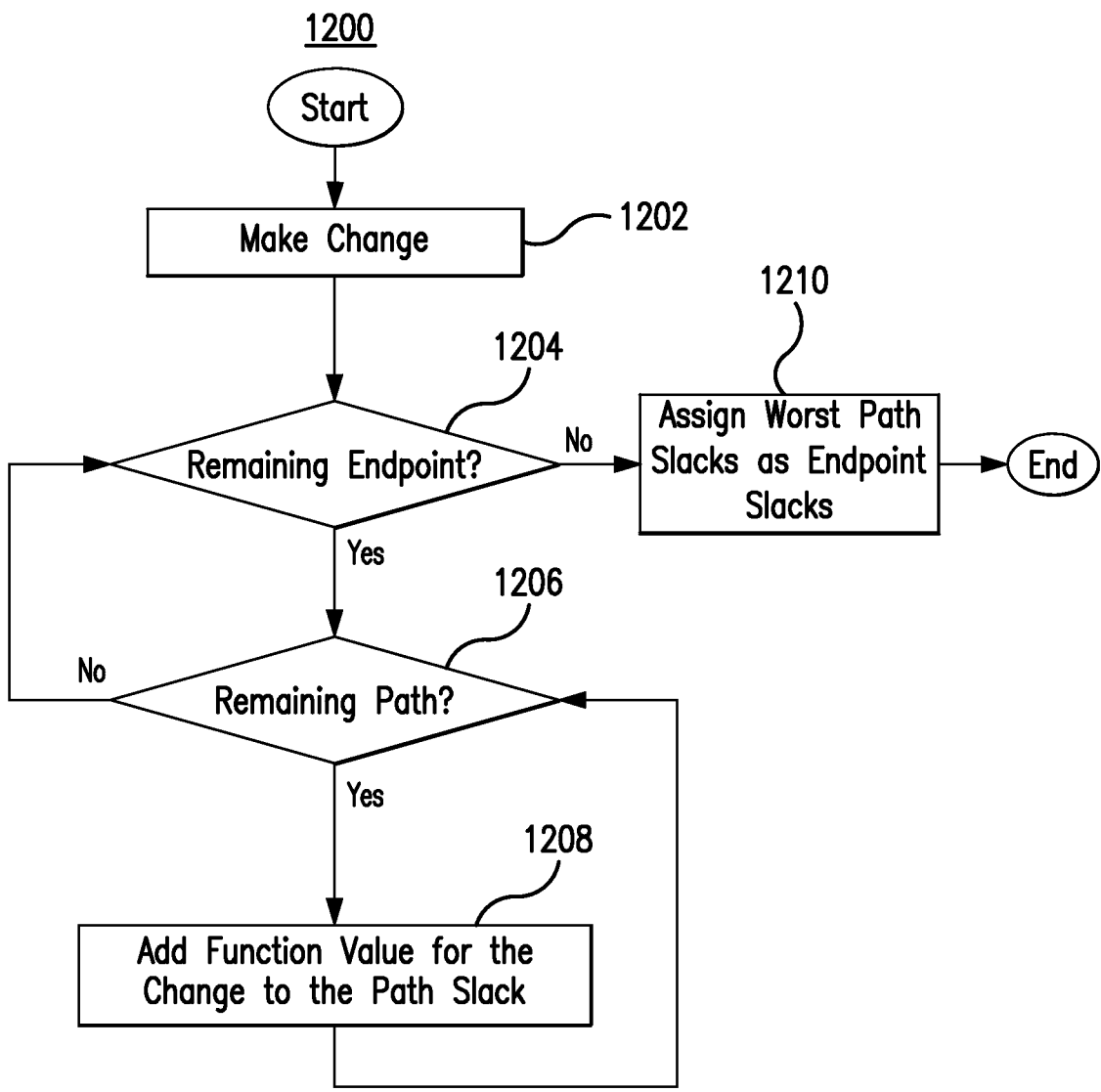
FIG. 12 is a flowchart of an example method for updating the slacks of paths.

FIG. 12 is a flowchart of an example method 1200. Generally, the method 1200 may be performed after the method 1100. In certain embodiments, the computer system performs the method 1200. By performing the method 1200, the computer system updates the slacks for the paths after making a change to the clock network or the one or more circuits.

In block 1202, the computer system makes a change to the clock network or the one or more circuits. As discussed previously, the change is a virtual change in that the change and its effects are simulated on the circuit design. The changes are not actually made to the circuit design at this step. In certain embodiments, the computer system may simulate the change by virtually making the change to the circuit design that includes the clock network or the one or more circuits. For example, the computer system may virtually adjust the sizes of certain components in the clock network or the one or more circuits. As another example, the computer system may virtually adjust, add, or remove one or more buffers from the clock network or the one or more circuits.

The computer system then updates the slacks for the paths in the clock network or the circuit design to account for the change. In blocks 1204 and 1206, the computer system determines whether there are endpoints or paths remaining to be updated in the clock network or the one or more circuits. If there is a remaining endpoint or a remaining path, the computer system selects the next path and adds the function value for the change to the slack of the path in block 1208. The function value may be determined by inputting the change made by the computer system to the function for the change that was previously determined in block 1104 of the method 1100 shown in FIG. 11. The computer system may input a magnitude of the change made in block 1202 into the function that was determined in block 1104. The function returns the function value for the change made in block 1202. The computer system then adds that function value to the slack for the path. For example, the function may characterize the effect of sizing changes on path slack, and the computer system may have made a sizing change in block 1202. The computer system inputs the sizing change made in block 1202 into the function, and the function returns the change to path slack caused by the sizing change. The computer system then adds the path slack change to the slack of the path. In this manner, the computer system updates the slack of the path with the slack change caused by the change made in block 1202.

After all the endpoints and paths have been analyzed, the computer system assigns the worst path slacks as endpoint slacks in block 1210. Stated differently, for each endpoint, the computer system determines the worst slack of the paths into the endpoint. The computer system then assigns that worst slack to the endpoint as the endpoint slack.

Figure 13:
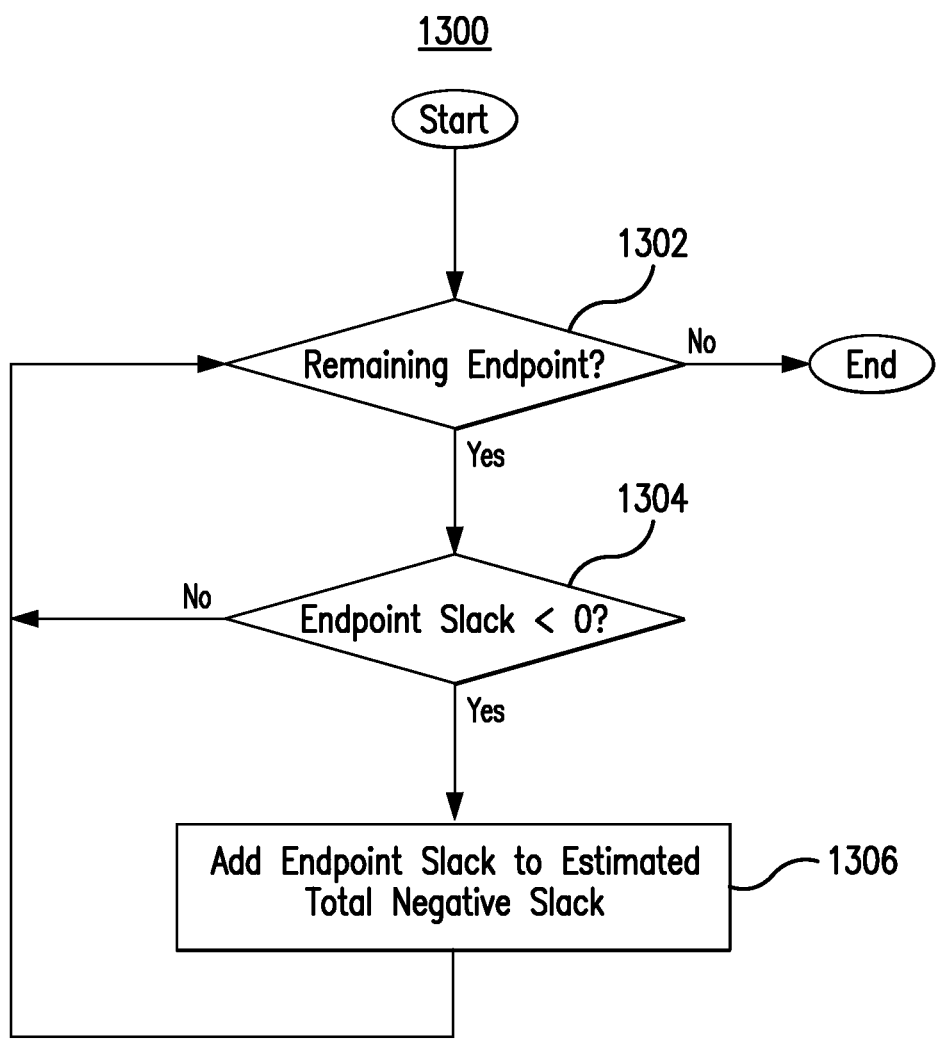
FIG. 13 is a flowchart of an example method for determining a total negative slack.

FIG. 13 is a flowchart of an example method 1300. Generally, the method 1300 is performed after the method 1200. In particular embodiments, the computer system performs the method 1300. By performing the method 1300, the computer system determines an estimated total negative slack for the circuit design.

In the method 1300, the computer system analyzes the endpoint slacks for each endpoint of the circuit design. In block 1302, the computer system determines whether there are any endpoints remaining to be analyzed. If so, the computer system selects the next endpoint and analyzes the endpoint slack for that endpoint. In block 1304, the computer system determines whether the endpoint slack for the endpoint is negative. If the endpoint slack is negative, the computer system adds that endpoint slack to an estimated total negative slack in block 1306. If the endpoint slack is not negative, then the computer system ignores that endpoint slack. As a result of performing the method 1300, the computer system determines an estimated total negative slack for the circuit design. The estimated total negative slack is a sum of the negative endpoint slacks of the circuit design.

Figure 14:
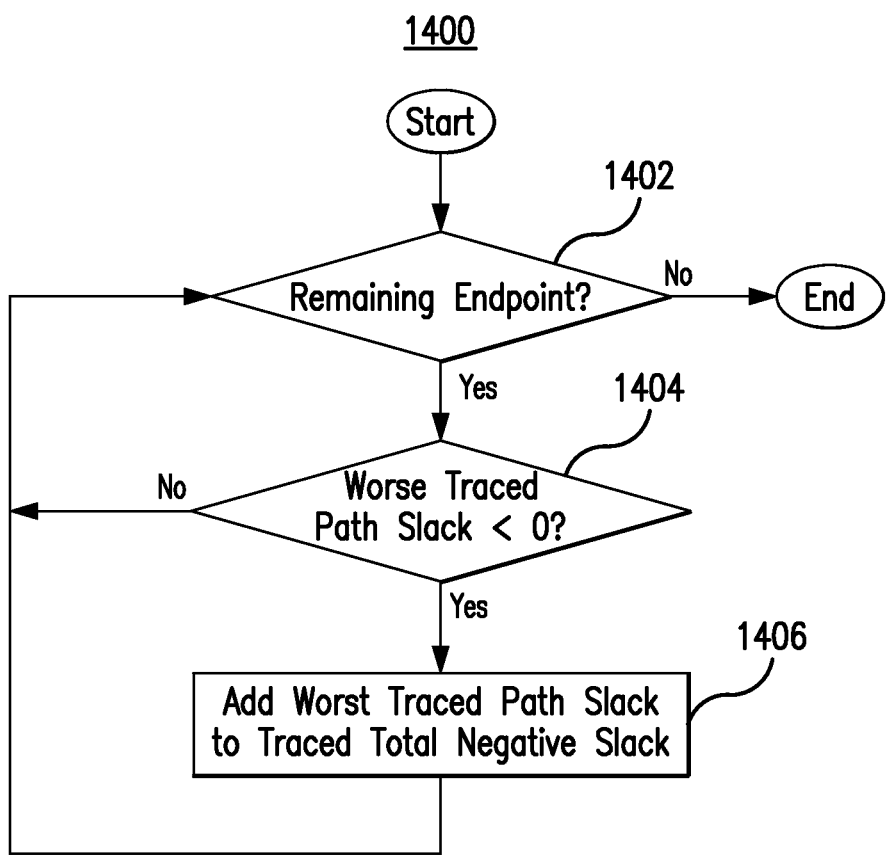
FIG. 14 is a flowchart of an example method for determining a traced total negative slack.

FIG. 14 is a flowchart of an example method 1400. Generally, the method 1400 is performed after the method 1300. In particular embodiments, the computer system performs the method 1400. By performing the method 1400, the computer system determines a traced total negative slack for the circuit design.

The computer system analyzes the slacks of the traced paths for each endpoint of the circuit design in blocks 1402 and 1404. In block 1402, the computer system determines whether there are endpoints in the circuit design remaining to be analyzed. If so, the computer system selects an endpoint and determines whether the worst traced path slack for the endpoint is negative in block 1404. If the worst slack for the traced paths of the endpoint is negative, then the computer system adds the worst traced path slack to a traced total negative slack for the clock network or the one or more circuits in block 1406. As a result, the traced total negative slack is a sum of the negative slacks of the traced paths for the endpoints of the circuit design. The computer system may use the traced total negative slack to determine whether the estimated total negative slack for the circuit design is adequate. When every endpoint of the circuit design has been analyzed, the computer system ends the method 1400.

Figure 15:
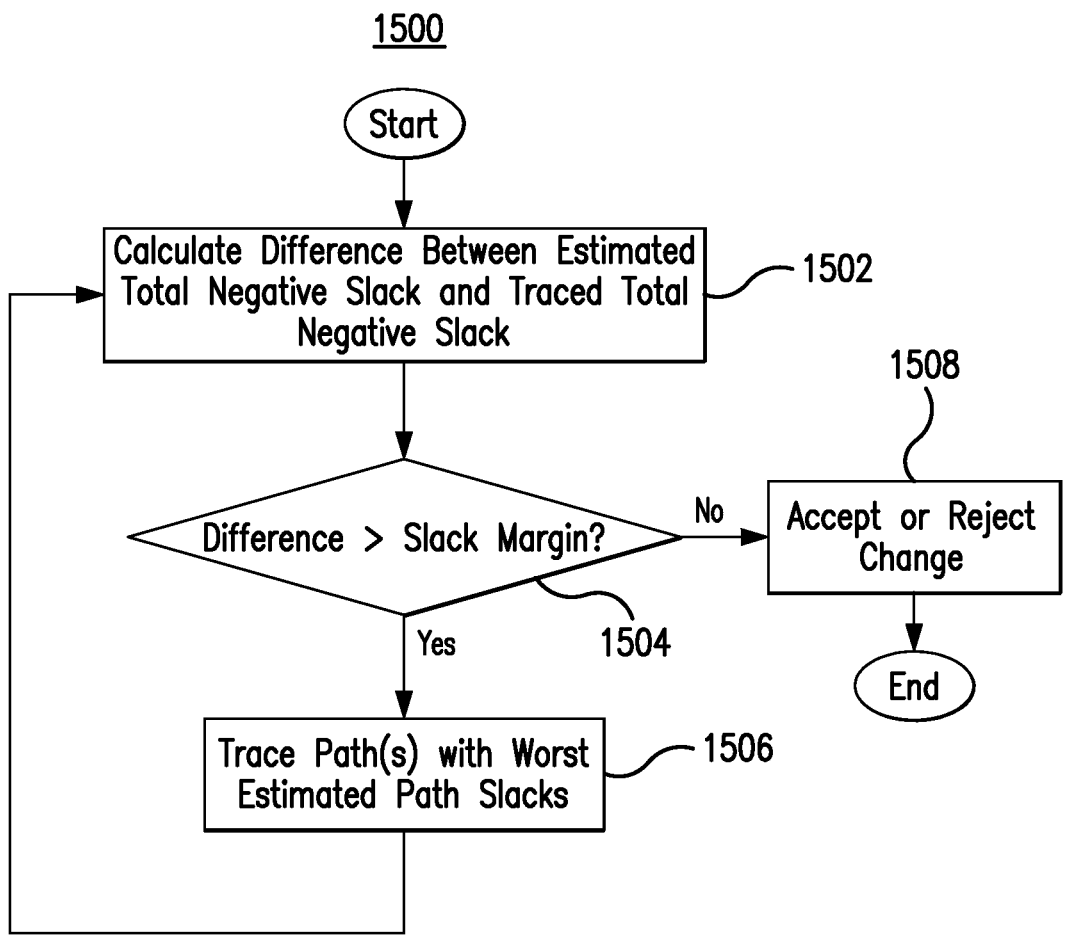
FIG. 15 is a flowchart of an example method for determining whether to accept a change.

FIG. 15 is a flowchart of an example method 1500. Generally, the method 1500 is performed after the method 1400. In particular embodiments, the computer system performs the method 1500. By performing the method 1500, the computer system determines whether to accept or reject the change made in block 1202 of the method 1200 shown in FIG. 12.

In block 1502, the computer system calculates a difference between the estimated total negative slack and the traced total negative slack of the circuit design. The computer system then evaluates this difference to determine whether the estimated total negative slack is adequate. In block 1054, the computer system determines whether the difference exceeds a slack margin. In some embodiments, the slack margin is a percentage of the total negative slack of the circuit design determined through static timing analysis. For example, the slack margin may be one percent or two percent of the total negative slack of the circuit design. If the difference exceeds the slack margin, the computer system traces one or more paths with the worst estimated path slacks in block 1506. Stated differently, the computer system traces one or more paths that were not previously traced in the method 1100. The computer system may identify, from these paths, the paths with the worst estimated slacks. The computer system may then select these paths and trace these paths to determine the actual slacks for the paths. After determining the actual slacks for these paths, the computer system updates the estimated total negative slack and the traced total negative slack for the circuit design and returns the block 1502 to update the difference.

In some embodiments, if the difference continues to exceed the slack margin, then the computer system may return to block 1202 of the method 1200 to adjust the change made to the circuit design. By adjusting the change, the computer system adjusts the function value that is added to the path slacks in block 1208. As a result, the computer system changes the estimated total negative slack and the traced total negative slack of the circuit design.

If the difference is less than or within the slack margin, then the computer system analyzes the estimated total negative slack for the circuit design, to determine whether to accept or reject the change made in block 1202 and block 1508. For example, the computer system may compare the estimated total negative slack to a threshold. If the estimated total negative slack meets the threshold, then the computer system may accept the change. If the estimated total negative slack does not meet the threshold, then the computer system may reject the change.

Figure 16:
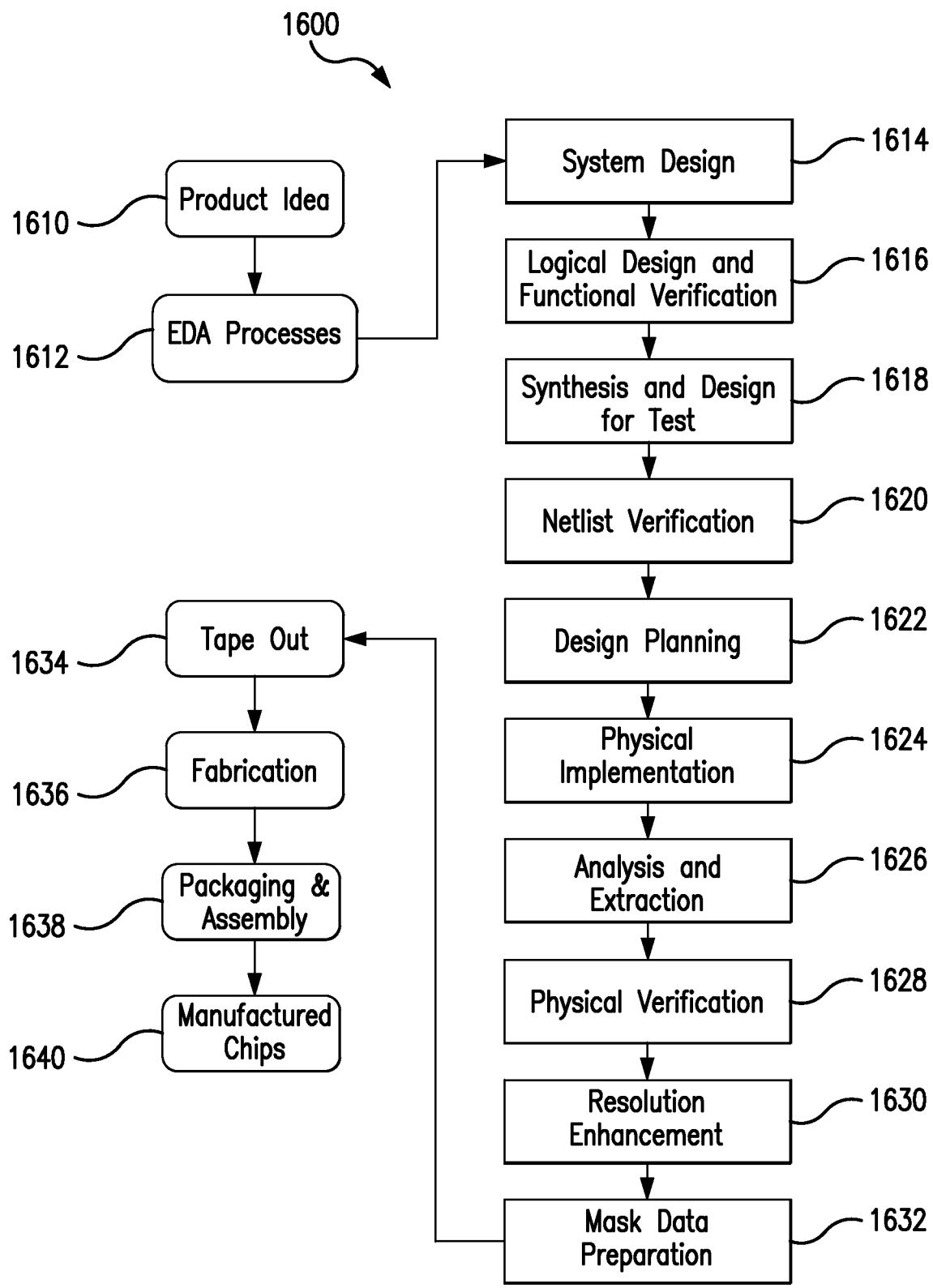
FIG. 16 is a flowchart of various processes used during the design and manufacture of an integrated circuit in accordance with some embodiments of the present disclosure.

FIG. 16 illustrates an example set of processes 1600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1610 with information supplied by a designer, information which is transformed to create an article of manufacture that uses a set of EDA processes 1612. When the design is finalized, the design is taped-out 1634, which is when artwork (e.g., geometric patterns) for the integrated circuit is sent to a fabrication facility to manufacture the mask set, which is then used to manufacture the integrated circuit. After tape-out, a semiconductor die is fabricated 1636 and packaging and assembly processes 1638 are performed to produce the finished integrated circuit 1640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 16. The processes described by be enabled by EDA products (or EDA systems).

During system design 1614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1620, the netlist is checked for compliance with timing constraints and for correspondence with the HDL code. During design planning 1622, an overall floor plan for the integrated circuit is constructed and analyzed for timing and top-level routing.

During layout or physical implementation 1624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1626, the circuit function is verified at the layout level, which permits refinement of the layout design. During physical verification 1628, the layout design is checked to ensure that manufacturing constraints are correct, such as DRC constraints, electrical constraints, lithographic constraints, and that circuitry function matches the HDL design specification. During resolution enhancement 1630, the geometry of the layout is transformed to improve how the circuit design is manufactured.

During tape-out, data is created to be used (after lithographic enhancements are applied if appropriate) for production of lithography masks. During mask data preparation 1632, the 'tape-out' data is used to produce lithography masks that are used to produce finished integrated circuits.

A storage subsystem of a computer system (such as computer system 1700 of FIG. 17) may be used to store the programs and data structures that are used by some or all of the EDA products described herein, and products used for development of cells for the library and for physical and logical design that use the library.

Figure 17:
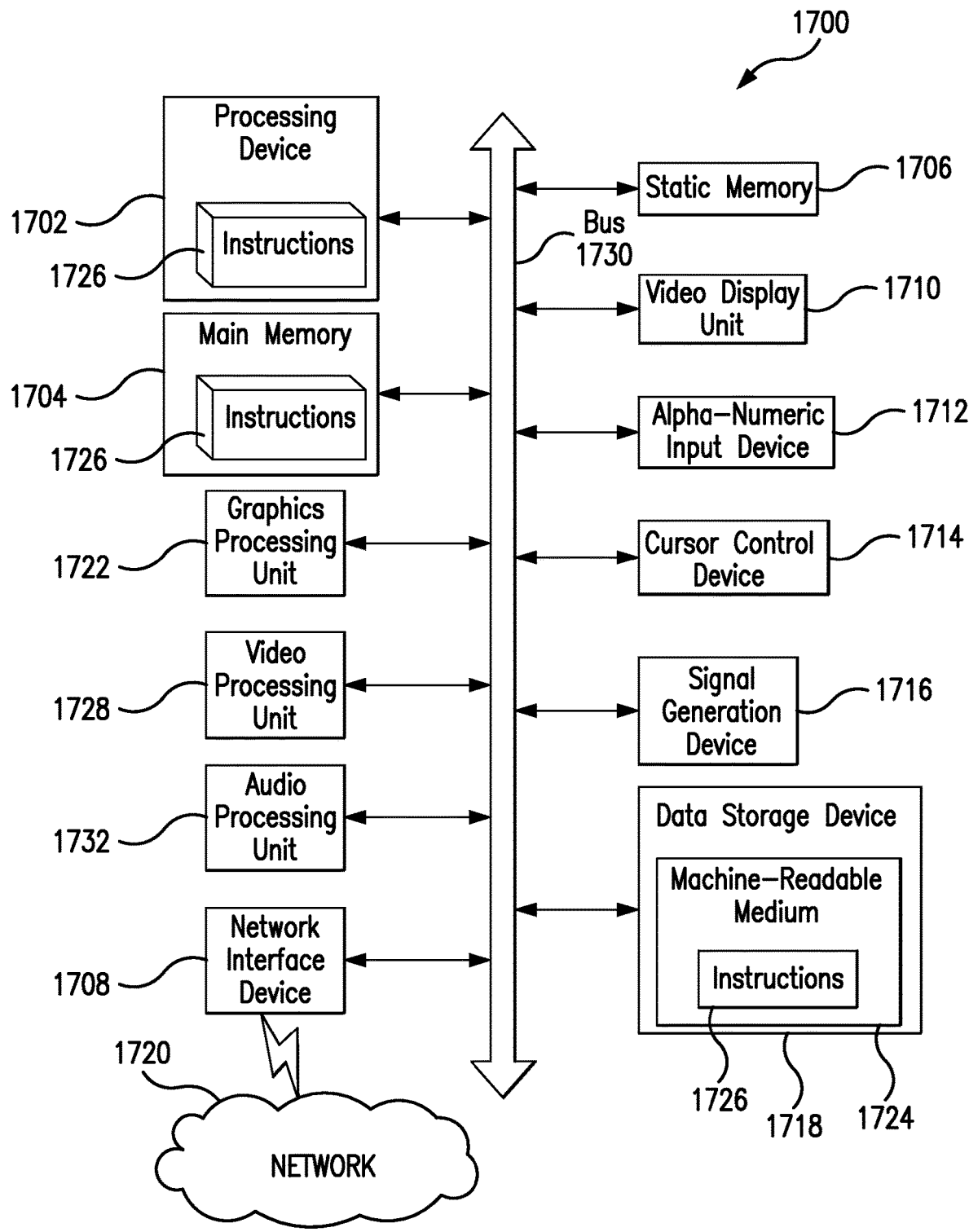
FIG. 17 depicts a diagram of an example computer system in which embodiments of the present disclosure may operate.

FIG. 17 illustrates an example machine of a computer system 1700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed)

network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1700 includes a processing device 1702, a main memory 1704 (e.g., read-only memory (ROM), flash memory, dynamic random access memory (DRAM) such as synchronous DRAM (SDRAM), a static memory 1706 (e.g., flash memory, static random access memory (SRAM), etc.), and a data storage device 1718, which communicate with each other via a bus 1730.

Processing device 1702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. The processing device 1702 may be configured to execute instructions 1726 for performing the operations and steps described herein.

The computer system 1700 may further include a network interface device 1708 to communicate over the network 1720. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), a graphics processing unit 1722, a signal generation device 1716 (e.g., a speaker), graphics processing unit 1722, video processing unit 1728, and audio processing unit 1732.

The data storage device 1718 may include a machine-readable storage medium 1724 (also known as a non-transitory computer-readable medium) on which is stored one or more sets of instructions 1726 or software embodying any one or more of the methodologies or functions described herein. The instructions 1726 may also reside, completely or at least partially, within the main memory 1704 and/or within the processing device 1702 during execution thereof by the computer system 1700, the main memory 1704 and the processing device 1702 also constituting machine-readable storage media.

In some implementations, the instructions 1726 include instructions to implement functionality corresponding to the present disclosure. While the machine-readable storage medium 1724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the FIGS. and like elements are labeled with like numerals. The disclosure and drawings are, accordingly, to be regarded in an illustrative sense rather than a restrictive sense.

What is claimed is:

1. A method for changing a circuit design, the method comprising:
    generating a propagation graph for the circuit design, the propagation graph comprising nodes representing:
        a first endpoint and a second endpoint of the circuit design;
        a first path to the first endpoint;
        a second path to the first endpoint; and
        a third path to the first endpoint;
    based on determining that the first path has an arrival time that is less than an arrival time of the third path by an amount greater than a defined margin, estimating a first slack for the first path based at least in part on a slack value of the first endpoint;
    based on determining that the second path has an arrival time that is within the defined margin of the arrival time of the third path, tracing the second path to determine a second slack for the second path;
    tracing the third path to determine a third slack for the third path;
    making a virtual change to the circuit design;
    determining a first endpoint slack for the first endpoint based at least in part on the first slack, the second slack, and the third slack; and
    accepting or rejecting the virtual change to the circuit design based at least in part on the first endpoint slack for the first endpoint and a second endpoint slack for the second endpoint.

2. The method of claim 1, further comprising performing static timing analysis on the circuit design before generating the propagation graph to determine the slack value of the first endpoint, the arrival time of the first path, the arrival time of the second path, and the arrival time of the third path.

3. The method of claim 2, wherein performing the static timing analysis further determines a slack value for a starting point of the circuit design, wherein the first slack is further based at least in part on the slack value for the starting point.

4. The method of claim 1, further comprising:
    generating a subgraph representing a portion of the circuit design;
    sampling effects of a plurality of changes to the subgraph to produce a plurality of sample points; and
    performing regression on the plurality of sample points to determine a function that characterizes the effects of the plurality of changes, wherein the first endpoint slack is further based at least in part on the function.

5. The method of claim 1, further comprising:
    determining an estimated total negative slack for the circuit design based at least in part on the first endpoint slack and the second endpoint slack; and
    determining a traced total negative slack for the circuit design based at least in part on the second endpoint slack but not the first endpoint slack.

6. The method of claim 5, further comprising based on a difference between the traced total negative slack and the estimated total negative slack exceeding a slack margin, tracing the first path a traced slack for the first path.

7. The method of claim 1, further comprising adding the first endpoint slack and the second endpoint slack to a total negative slack of the circuit design based on determining that the first endpoint slack and the second endpoint slack are negative, wherein accepting or rejecting the virtual change is based at least in part on the total negative slack of the circuit design.

8. The method of claim 1, wherein the nodes of the propagation graph further represent a starting point of the circuit design and an output of a combination logic cell of the circuit design.

9. A system for changing a circuit design, the system comprising:
    a memory; and
    a processor communicatively coupled to the memory, the processor configured to:
        generate a propagation graph for the circuit design, the propagation graph comprising nodes representing:
            a first endpoint and a second endpoint of the circuit design;
            a first path to the first endpoint;
            a second path to the first endpoint; and
            a third path to the first endpoint;
        based on determining that the first path has an arrival time that is less than an arrival time of the third path by an amount greater than a defined margin, estimate a first slack for the first path based at least in part on a slack value of the first endpoint;
        based on determining that the second path has an arrival time that is within the defined margin of the arrival time of the third path, trace the second path to determine a second slack for the second path;
        trace the third path to determine a third slack for the third path;
        make a virtual change to the circuit design;
        determine a first endpoint slack for the first endpoint based at least in part on the first slack, the second slack, and the third slack; and
        accept or reject the virtual change to the circuit design based at least in part on the first endpoint slack for the first endpoint and a second endpoint slack for the second endpoint.

10. The system of claim 9, wherein the processor is further configured to perform static timing analysis on the circuit design before generating the propagation graph to determine the slack value of the first endpoint, the arrival time of the first path, the arrival time of the second path, and the arrival time of the third path.

11. The system of claim 10, wherein performing the static timing analysis further determines a slack value for a starting point of the circuit design, wherein the first slack is further based at least in part on the slack value for the starting point.

12. The system of claim 9, wherein the processor is further configured to:
    generate a subgraph representing a portion of the circuit design;
    sample effects of a plurality of changes to the subgraph to produce a plurality of sample points; and perform regression on the plurality of sample points to determine a function that characterizes the effects of the plurality of changes, wherein the first endpoint slack is further based at least in part on the function.

13. The system of claim 9, wherein the processor is further configured to:
   determine an estimated total negative slack for the circuit design based at least in part on the first endpoint slack and the second endpoint slack; and
   determine a traced total negative slack for the circuit design based at least in part on the second endpoint slack but not the first endpoint slack.

14. The system of claim 13, wherein the processor is further configured to, based on a difference between the traced total negative slack and the estimated total negative slack exceeding a slack margin, trace the first path a traced slack for the first path.

15. The system of claim 9, wherein the processor is further configured to add the first endpoint slack and the second endpoint slack to a total negative slack of the circuit design based on determining that the first endpoint slack and the second endpoint slack are negative, wherein accepting or rejecting the virtual change is based at least in part on the total negative slack of the circuit design.

16. The system of claim 9, wherein the nodes of the propagation graph further represent a starting point of the circuit design and an output of a combination logic cell of the circuit design.

17. A non-transitory computer readable medium storing instructions for changing a circuit design that, when executed by a processor, cause the processor to:
   generate a propagation graph for the circuit design, the propagation graph comprising nodes representing:
      a first endpoint and a second endpoint of the circuit design;
      a first path to the first endpoint;
      a second path to the first endpoint; and
      a third path to the first endpoint;
   based on determining that the first path has an arrival time that is less than an arrival time of the third path by an amount greater than a defined margin, estimate a first slack for the first path based at least in part on a slack value of the first endpoint;
   based on determining that the second path has an arrival time that is within the defined margin of the arrival time of the third path, trace the second path to determine a second slack for the second path;
   trace the third path to determine a third slack for the third path;
   make a virtual change to the circuit design;
   update the first slack, the second slack, and the third slack based on the virtual change;
   determine a first endpoint slack for the first endpoint as the worst of the updated first slack, the updated second slack, and the updated third slack;
   determine a total negative slack for the circuit design based on adding the first endpoint slack and a second endpoint slack for the second endpoint; and
   accept or reject the virtual change to the circuit design based at least in part on the total negative slack for the circuit design.

18. The medium of claim 17, wherein the instructions, when executed, further cause the processor to perform static timing analysis on the circuit design before generating the propagation graph to determine the slack value of the first endpoint, the arrival time of the first path, the arrival time of the second path, and the arrival time of the third path.

19. The medium of claim 17, wherein the instructions, when executed, further cause the processor to:
   generate a subgraph representing a portion of the circuit design;
   sample effects of a plurality of changes to the subgraph to produce a plurality of sample points; and
   perform regression on the plurality of sample points to determine a function that characterizes the effects of the plurality of changes, wherein the first endpoint slack is further based at least in part on the function.

20. The medium of claim 17, wherein the nodes of the propagation graph further represent a starting point of the circuit design and an output of a combination logic cell of the circuit design.

* * * * *